Sept. 6, 1955     E. J. SVENSON     2,716,888
APPARATUS FOR TESTING POWER STEERING
Filed Nov. 6, 1953     6 Sheets-Sheet 1
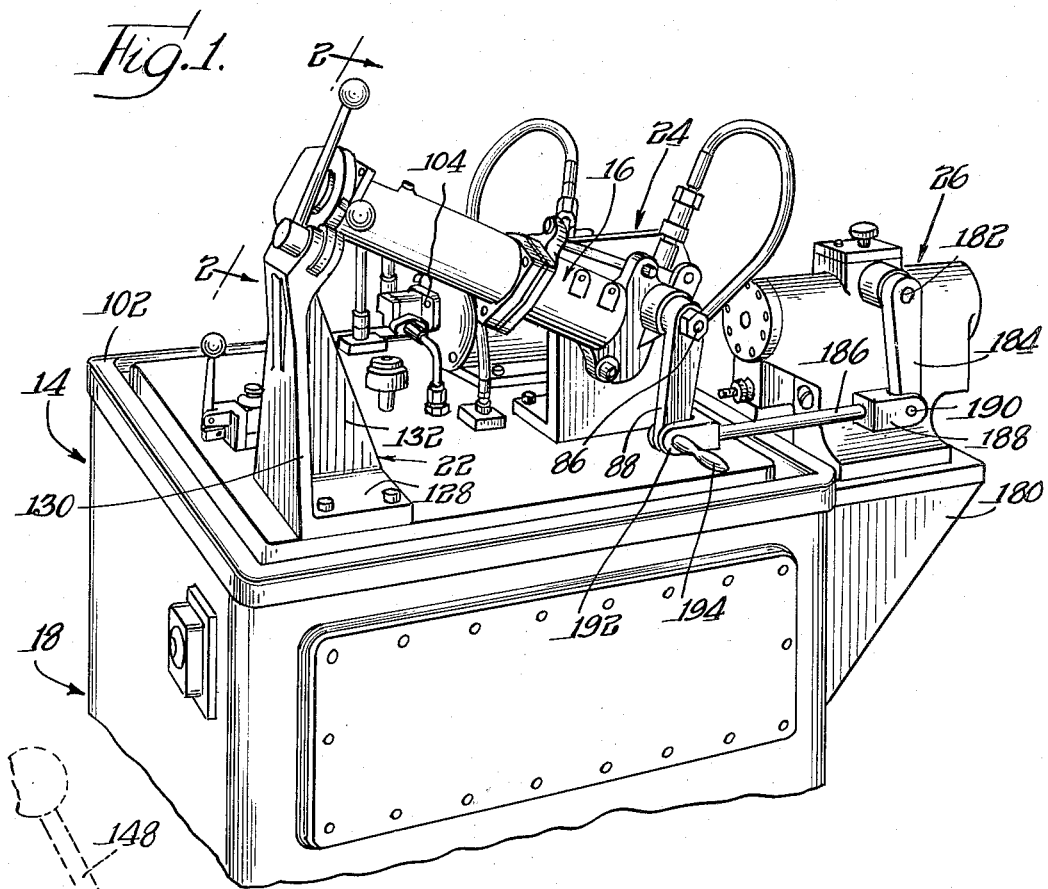
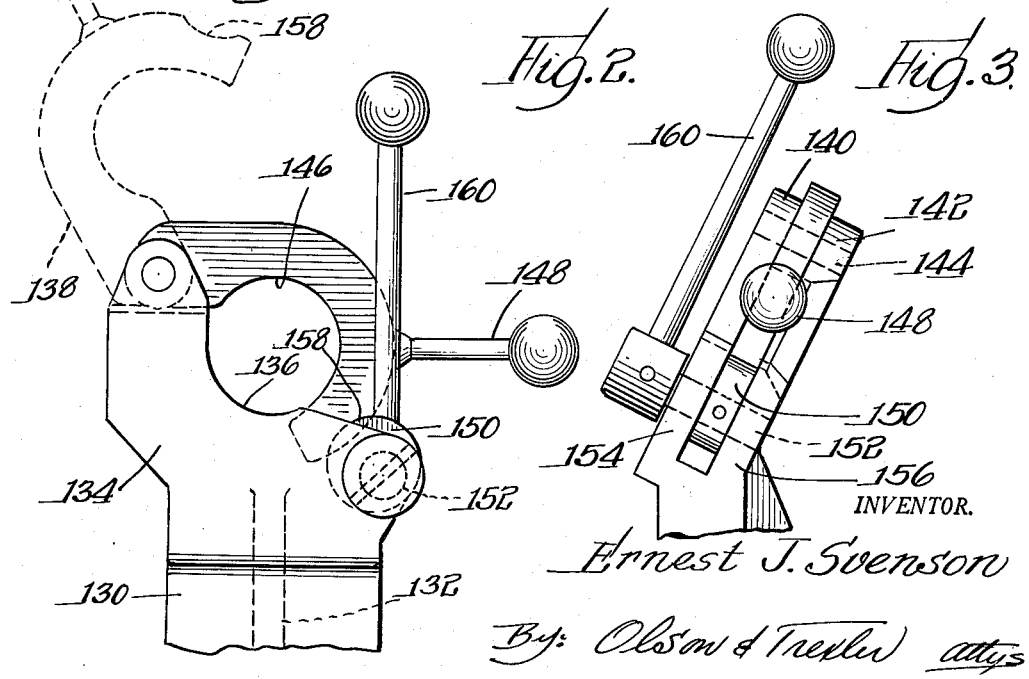
INVENTOR.
Ernest J. Svenson
By: Olson & Trexler   att'ys Sept. 6, 1955 E. J. SVENSON 2,716,888
APPARATUS FOR TESTING POWER STEERING
Filed Nov. 6, 1953 6 Sheets-Sheet 2
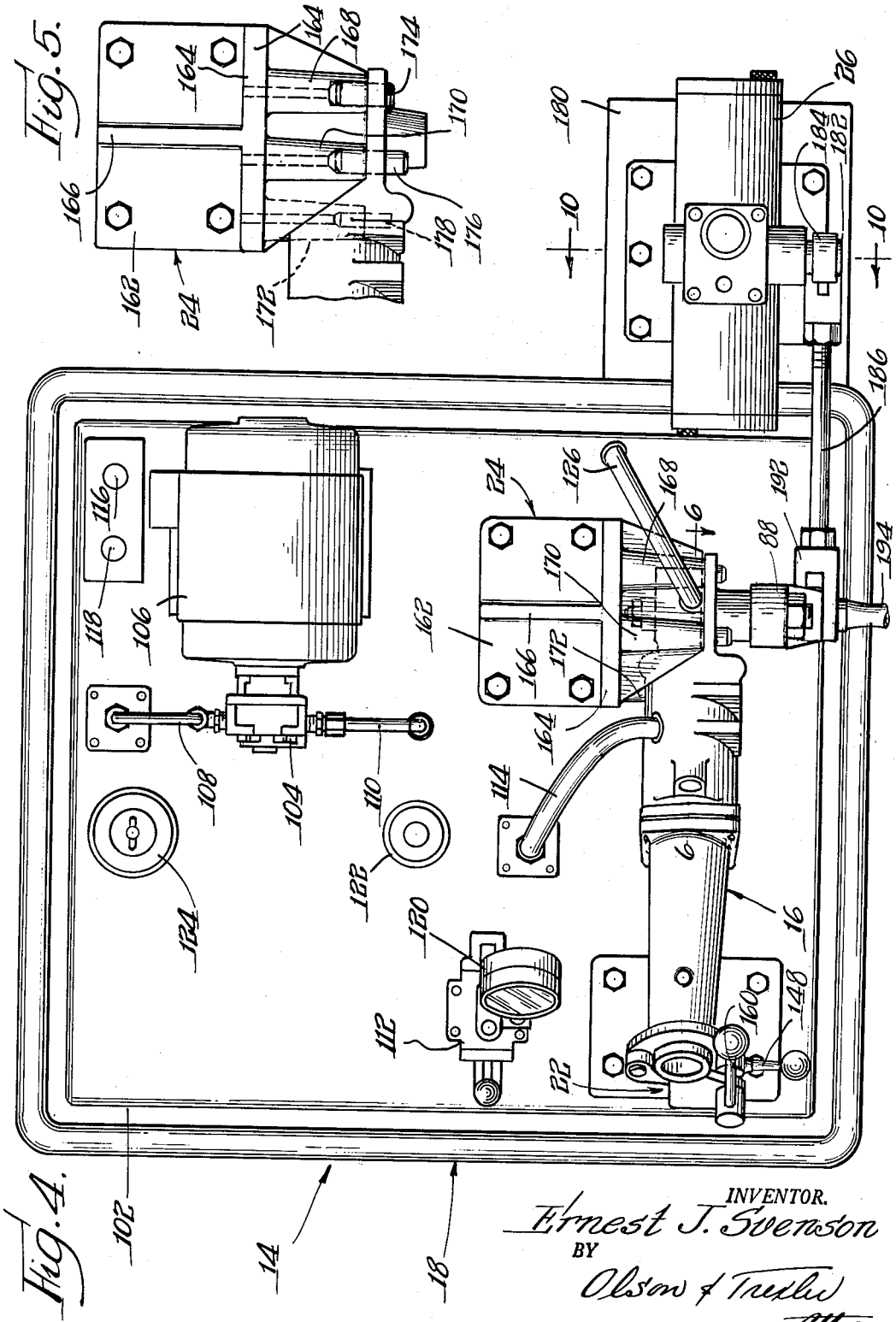
INVENTOR.
Ernest J. Svenson
BY
Olson & Trexler
Attys.

Sept. 6, 1955     E. J. SVENSON     2,716,888
APPARATUS FOR TESTING POWER STEERING
Filed Nov. 6, 1953     6 Sheets-Sheet 3
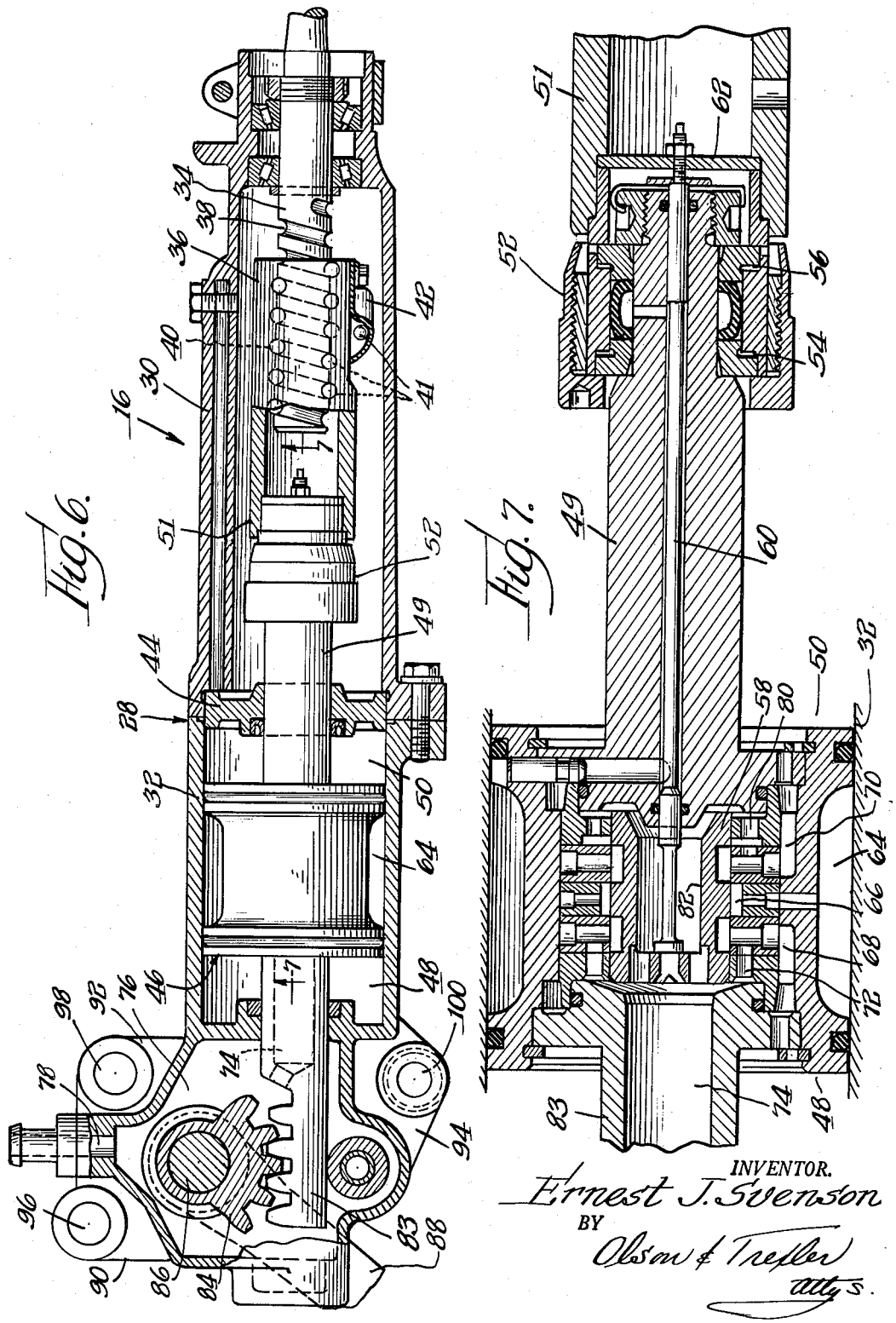
INVENTOR.
Ernest J. Svenson
BY
Olson & Trexler
Attys.

Sept. 6, 1955                    E. J. SVENSON                    2,716,888
                    APPARATUS FOR TESTING POWER STEERING
Filed Nov. 6, 1953                                          6 Sheets-Sheet 4

INVENTOR.
Ernest J. Svenson
By: Olson & Trexler
                attys.

Sept. 6, 1955  E. J. SVENSON  2,716,888
APPARATUS FOR TESTING POWER STEERING
Filed Nov. 6, 1953  6 Sheets-Sheet 5

INVENTOR.
Ernest J. Svenson
BY
Olson & Trexler
attys.

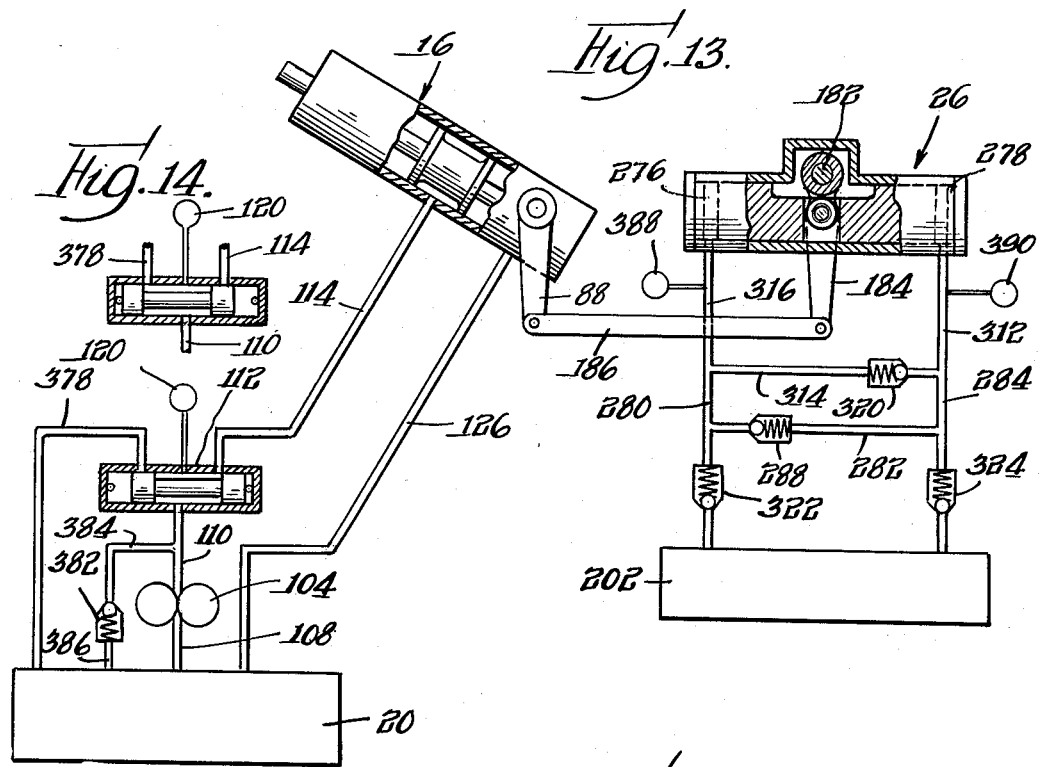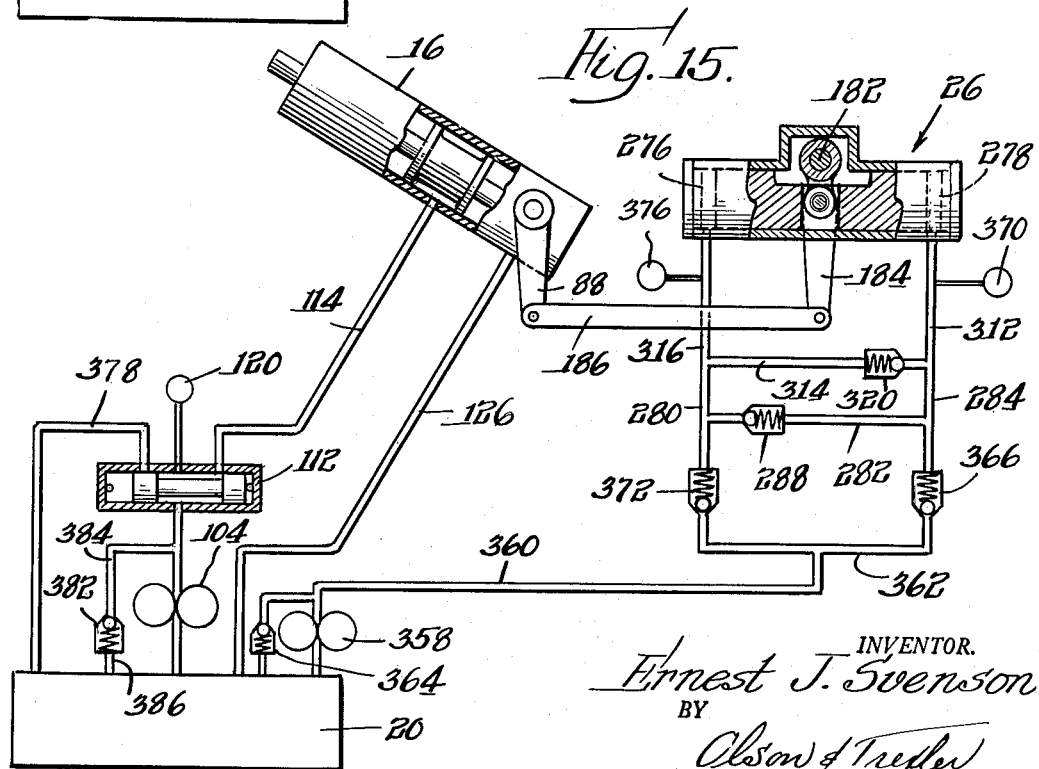

United States Patent Office 2,716,888
Patented Sept. 6, 1955

2,716,888

APPARATUS FOR TESTING POWER STEERING

Ernest J. Svenson, Rockford, Ill.

Application November 6, 1953, Serial No. 390,678

19 Claims. (Cl. 73—116)

The present invention relates to a novel apparatus for testing steering mechanisms, and more particularly to a novel testing apparatus for power steering units of the type used in motor vehicles.

In a motor vehicle which is provided with hydraulic power steering, the operator is assisted, in the turning of the front road wheels to steer the vehicle, by hydraulic power, which is effective for that purpose only while the operator is operating the steering wheel or its equivalent to continuously shift a control valve out of its relative neutral position to admit fluid under pressure to one end of the cylinder of the power steering unit. For practical power steering, the control valve and its associated members must function properly and in cooperation with the steering wheel at all times. In addition, the output torque of the power steering unit must be sufficient to overcome the maximum expected road resistance of the front road wheels to turning for steering. In many instances heretofore, power steering units have been assembled in motor vehicles, such as automobiles, and then tested to determine whether or not they operate satisfactorily. This procedure can obviously be time consuming and relatively expensive in the event a steering unit is found to be defective so that it must be removed from the automobile and replaced by another unit. It is, therefore, an object of the present invention to provide a novel apparatus for testing steering mechanisms, such as power steering units, before the unit is assembled with a motor vehicle or the like.

Another object of the present invention is to provide a novel testing apparatus for power steering units which simulates road resistance of vehicle wheels to turning, whereby the steering mechanism may be checked before it is assembled with an automobile.

Another object of my invention is to provide in an apparatus for testing steering units a novel means for simulating road resistance of vehicle wheels to turning for steering, which means may be adjusted to vary the amount of simulated road resistance.

Another object of my invention is to provide in an apparatus for testing hydraulic power steering units for motor vehicles a simple means for measuring the output torque of the power steering units.

Still another object of the present invention is to provide an apparatus for testing steering mechanisms with novel means for simulating road resistance of vehicle wheels to turning in either direction, which means is constructed so as substantailly to eliminate any possible play or backlash therein when the steering mechanism being tested is turned in one direction and then the other, whereby the operability of the steering unit may be accurately determined.

A further object of the present invention is to provide a novel apparatus of the above described type on which a steering unit to be tested may be quickly and easily assembled or disassembled to facilitate rapid and economical testing.

Another object of my invention is to provide a new apparatus for testing hydraulic power steering units for motor vehicles which is of simple and durable construction and simple and economical to operate.

Other objects and advantages of the present invention will become apparent from the following description and the accompanying drawings, wherein:

Fig. 1 is a perspective view showing a testing apparatus embodying the features of this invention with a power steering unit to be tested mounted on the apparatus;

Fig. 2 is an enlarged elevational view taken along line 2—2 in Fig. 1 and showing a portion of a clamping means used to support the steering unit;

Fig. 3 is a side elevational view of the clamping means portion shown in Fig. 2;

Fig. 4 is a plan view of the novel testing apparatus of this invention;

Fig. 5 is an enlarged plan view showing the means for supporting the lower end of the power steering unit on the testing apparatus;

Fig. 6 is an enlarged fragmentary view of a power steering unit taken along line 6—6 in Fig. 4 and partially in cross section;

Fig. 7 is an enlarged cross sectional view taken along line 7—7 in Fig. 6;

Fig. 13 is a diagrammatic view illustrating the hydraulic system of the novel apparatus;

Fig. 14 is a diagrammatic view showing the two position valve of Fig. 13 adjusted to return fluid to the reservoir; and Fig. 15 is a diagrammatic view illustrating the hydraulic system of a modified form of the present invention.

Figure 8:
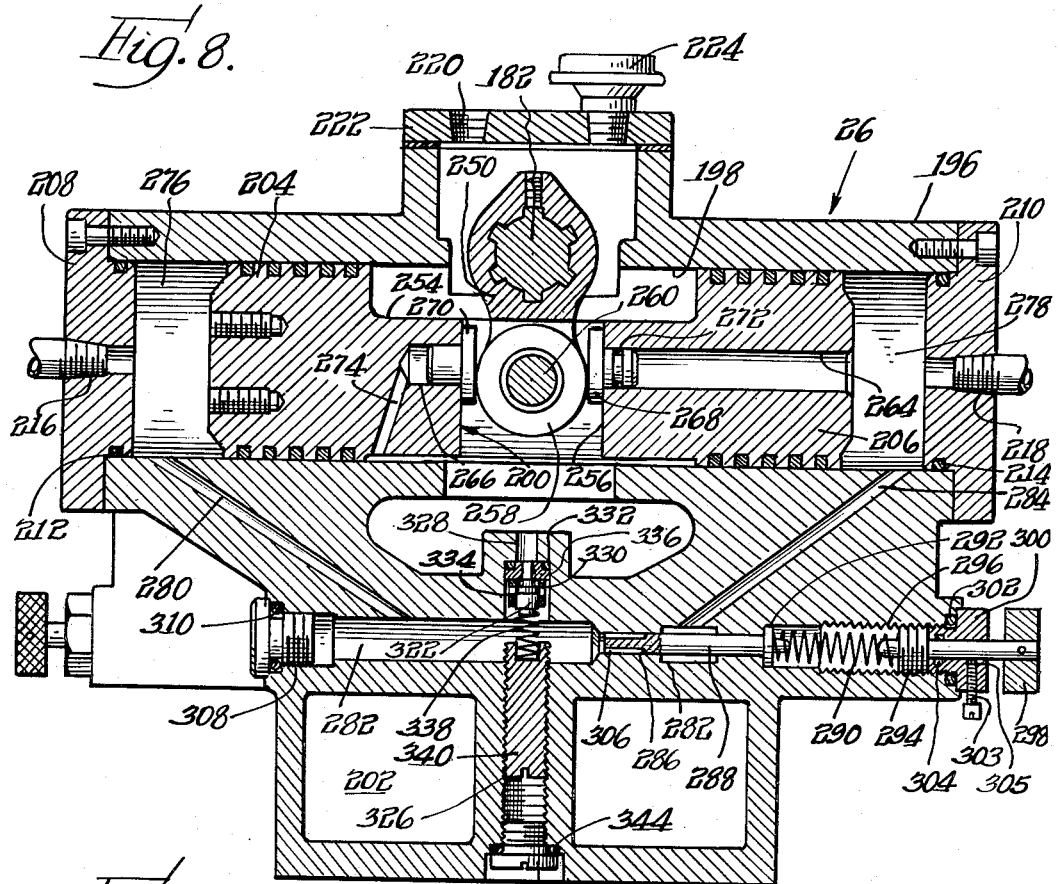
Fig. 8 is a cross sectional view taken along line 8—8 in Fig. 10.

Referring now more specifically to the drawings, wherein like parts are designated by the same numerals throughout the various figures, a testing apparatus 14 for inspecting a power steering unit 16 is shown best in Figs. 1 and 4. In general, the testing apparatus includes a stand or base 18 having a hydraulic fluid tank 20 therein (see Fig. 13), support means 22 and 24 for mounting the steering unit on the base, and a reactor 26.

The hydraulic steering unit 16 may be of any conventional design and forms no part of this invention. Therefore, the steering unit is shown in Figs. 1, 4, 6 and 7 in somewhat simplified form and will be described only insofar as it is necessary to facilitate understanding of the present invention.

In Figs. 6 and 7, a hydraulic motor section 28 of the steering unit 16 is illustrated which includes a pair of tubular housing members 30 and 32 bolted or otherwise secured together. A shaft 34 is rotatably mounted in the section 30 and suitable bearing means is provided for preventing axial shifting of the shaft. This shaft is adapted to be connected to and actuated by a conventional automobile steering wheel or the like in the usual manner. A sleeve or nut member 36 surrounds the inner end of the shaft 34, and the shaft and sleeve or nut member are provided with spiral grooves 38 and 40 which cooperate to retain a plurality of steel balls 41. Opposite ends of the spiral groove in the sleeve or ball nut 36 are interconnected by a tube assembly 42, thereby providing a closed circuit of travel for the balls. Since the shaft 34 is retained against axial movement, any rotation of the shaft causes axial movement of the sleeve or ball nut 36.

The interior of the tube or housing section 32 is sealed from the tube or housing section 30 by a partition 44, and a double-ended piston 46 is slidably disposed within the housing section 32 to provide fluid chambers 48 and 50 at opposite ends thereof. The piston includes an actuating rod 49 which is connected to an extension 51 of the sleeve or ball nut 36 by the means generally designated at 52. This connecting means need not be described in detail, and it suffices to say that the connecting means is such that there is a small amount of axial play between the piston and the ball nut equal to the clearance shown at 54 and 56.

The piston and piston rod are hollow, and a valve member 58 is slidably disposed within the piston and is rigidly connected with the sleeve or ball nut extension 51 by means of a valve stem 60 and connecting plate 62.

A source of hydraulic fluid under pressure, not shown, is connected to the power steering unit for pressurizing an annular chamber 64 around the piston. When the valve 58 and the piston are relatively shifted by the amount of slack indicated at 54—56, a port 66 in the piston is uncovered enough to allow fluid under pressure to pass from the chamber 64 through either a duct 68 or a duct 70 to the chamber 48 or chamber 50 depending on the direction in which the valve has been shifted. When chamber 48 is contracted due to movement of the piston, fluid is exhausted from the chamber 48 through duct 68, and a duct 72, and out port 74, chamber 76, and port 78 from where it is returned to the reservoir of the hydraulic system. When chamber 50 is contracted due to movement of the piston, the exhaust is through duct 70 and a duct 80, then through the hollow central portion 82 of the valve 58 and out ports 74 and 78.

It is understood that the piston 46 will move only slightly when fluid under pressure is introduced into either chamber 48 or chamber 50 before the port 66 is again closed. Further movement of the piston will require further turning of the shaft 34 to open or reopen the port 66 by again shifting valve 58 relative to the piston. As long as the port 66 is kept slightly open, the piston will keep moving due to pressure of the hydraulic fluid. Should the hydraulic power system fail for any reason, the operator will have full manual control, because after the play or slack at 54—56 is taken up due to relative movement of the sleeve or ball nut 36 and the piston rod, the piston rod and ball nut will move as a unit upon further turning of the steering wheel in the same direction.

The free end of the housing section 32 is enlarged to provide the above mentioned chamber 76, and this chamber houses an end 83 of the piston rod, which end has rack teeth formed thereon for coopertaion with teeth on a pinion sector 84. The pinion sector is fixed on a rotatable shaft 86, and the shaft is connected to a pitman arm 88 adapted to be connected to the steering mechanism of a vehicle. Thus, to turn the vehicle wheels, the operator needs only to keep turning the steering wheel enough to keep port 66 slightly open so that the piston moves to actuate the pinion sector. The enlarged free end of the housing section 32 is provided with lugs 90, 92 and 94 having apertures 96, 98 and 100 therethrough for receiving bolts or the like used to mount the unit to a vehicle. These holes are also used to receive mounting pins when the unit is supported on the testing apparatus in the manner described below.

Referring now particularly to Figs. 1 and 4, it can be seen that the base or stand 18 having the integral hydraulic fluid tank or reservoir 20 therein is provided with a tank cover plate 102. As will be understood, the tank or reservoir 20 may be provided with oil filters, a drain plug, and an oil level sight, if desired. A hydraulic pump 104 driven by an electric motor 106 mounted on the cover plate 102 is provided for pumping hydraulic fluid under pressure to the steering unit. The hydraulic fluid is drawn from the reservoir tank 20 through a pump intake line 108 and discharged from the pump through line 110. The discharge line 110 passes beneath the cover plate and to a three-way two-position manually operated control valve 112 mounted on the cover plate, and thence either to the steering unit through line 114 or back into the reservoir, depending on the position of the control valve. Start and stop push buttons 116 and 118 are provided for the electric motor. The details of the motor, pump, and control valve need not be shown or described since these details form no part of the present invention. A pressure gauge 120 is mounted adjacent the control valve and is connected to indicate the fluid pressure in the line 114 directing the fluid to the steering unit, and this connection may be made in any conventional manner. In order to prevent the creation of a partial vacuum in the hydraulic reservoir tank 20, "breathers" 122 and 124 are provided in the cover plate 102, and, in addition, the breather 124 may be removed to permit filling of the tank. Hydraulic fluid is discharged from the steering unit to the tank 20 by means of a flexible conduit 126 connected to the above described port 78.

The power steering unit is preferably supported on the testing apparatus in an inclined position which is generally similar to the position of the unit when assembled in an automobile or the like. As shown best in Figs. 1, 2 and 3, the upper end of the steering unit is supported by the bracket 22, which bracket includes a base portion 128 bolted or otherwise secured to the cover plate 102 and an elongated upstanding wall 130. The wall 130 may be reinforced by a web 132, if desired. The upper end of the wall 130 is provided with an inclined enlarged portion 134 having a substantially semicircular seat 136 thereon for receiving the upper end of the steering unit. A clamping member 138 is pivotally mounted between spaced lugs 140 and 142 on the enlarged portion 134 by means of a pin 144. The clamping member is provided with an internal generally semicircular seat 146 complementing the seat 136 to enclose completely the upper end of the power steering unit. A handle 148 may be provided on the clamping member to facilitate operation thereof. In order to expedite the mounting and dismounting of the steering unit, it is desirable that simple and quick acting means for locking the clamping member in its closed position be provided. This means includes an eccentric cam 150 rotatably mounted by a pin 152 between lugs 154 and 156, which cam is adapted to be rotated so that it seats in a recess 158 formed in the clamping member in the manner shown best in Fig. 2. An actuating lever 160 is secured to an end of the pin 152 by suitable means to rotate the cam to and from the locking position shown in Fig. 2. With the cam in the locking position, it is merely necessary to rotate the lever, and thus the cam in a clockwise direction, as viewed in Fig. 2, so that the cam disengages from the recess 158 to release the clamping member.

The lower end of the power steering unit may be quickly and easily mounted on the testing apparatus with the mounting means 24 shown best in Figs. 1, 4 and 5. This mounting means includes a bracket having a base 162 screwed or bolted to the cover plate 102 and an upstanding wall 164 reinforced by a web 166. A plurality of protuberances 168, 170 and 172 extend outwardly from the wall 164 and are provided with apertures for receiving pins 174, 176 and 178, respectively. These pins are adapted to slide into the above described apertures 96, 98 and 100 in the steering unit housing so that the pins in connection with the above described clamping means securely support the steering unit.

As shown in Figs. 1 and 4, the novel hydraulic reactor 26 of the present invention is bolted or otherwise secured to a bracket 180 mounted on the side of the base or stand 18. The reactor, which will be fully described hereinbelow, is adapted to be mechanically connected with a power steering unit mounted on the testing apparatus by means of a rotatable shaft 182 forming a part of the reactor. A reactor arm 184 is keyed or otherwise fixed to the shaft 182 and is also pivotally fastened to a connecting rod 186 extending between the above described pitman arm 88 on the power steering unit and the reactor arm 184. In the illustrated embodiment, the connecting rod 186 is provided with a clevis 188 which is connected to the reactor arm 184 by a pin 190 and a clevis 192 connected to the pitman arm 88 by a pin 194. Since the pitman arm 88 is rigidly fixed to the shaft 86 of the steering unit, it is clear that any rotation of the shaft 86 will be transmitted by the linkage mechanism through the shaft 182 of the reactor.

Figure 9:
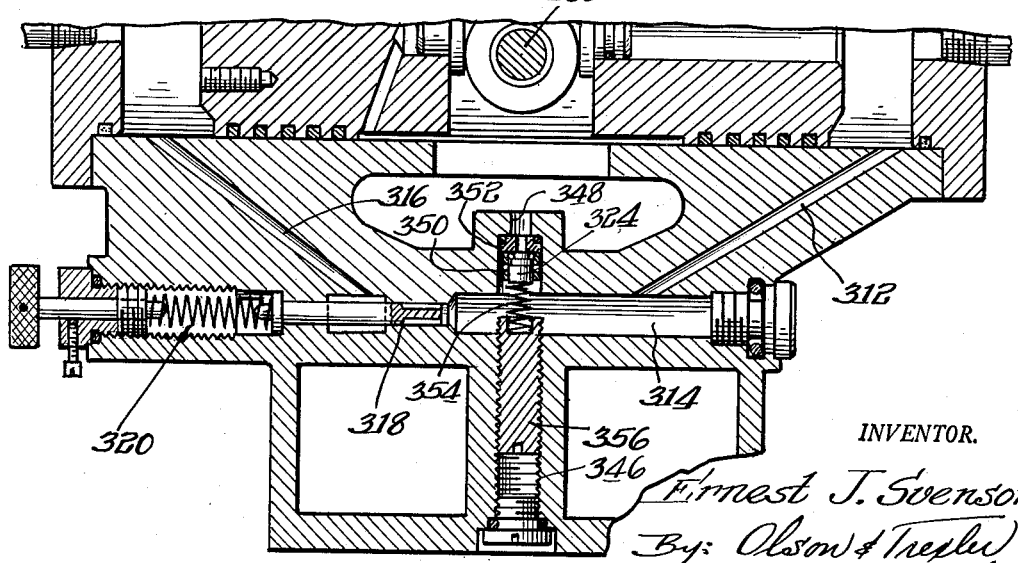
Fig. 9 is a fragmentary cross sectional view taken along line 9—9 in Fig. 10.
Figure 10:
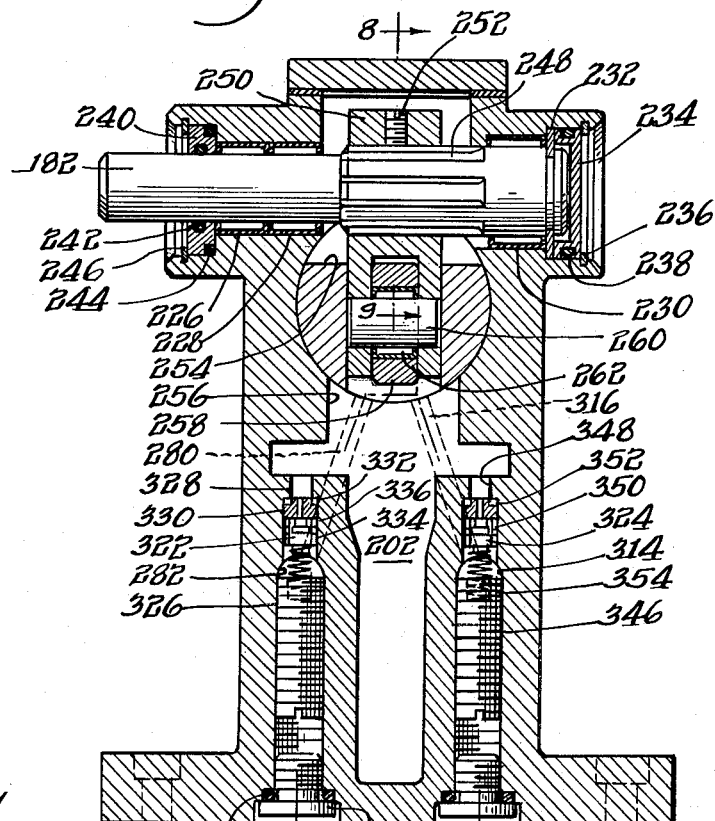
Fig. 10 is a cross sectional view taken along line 10—10 in Fig. 4.
Figure 11:
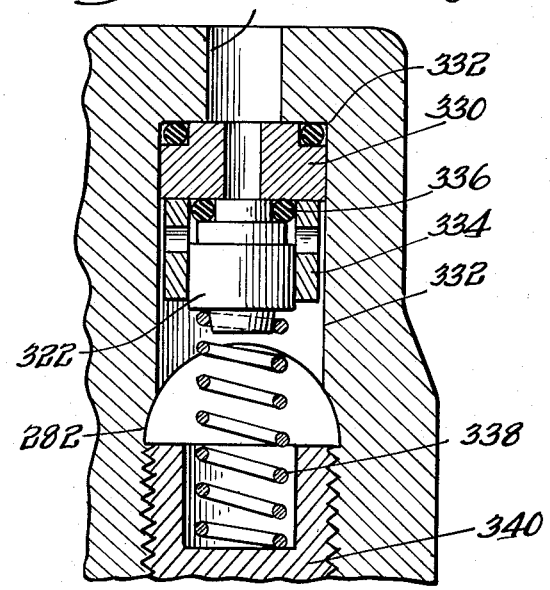
Fig. 11 is an enlarged fragmentary cross sectional view taken along the same line as Fig. 10 and showing the check valve in greater detail.

The reactor 26 is illustrated best in Figs. 8, 9 and 10 and includes a housing 196 having a chamber or cylinder 198 therein for slidably receiving a piston 200 and a chamber 202 providing a hydraulic fluid reservoir for the reactor. The piston 200 is of the double headed type and is thus provided with opositely facing heads 204 and 206. The opposite ends of the cylinder 196 are closed by end plates 208 and 210, respectively, which are secured to the housing by screws or other suitable means and are sealed against the escape of hydraulic liquid by O-rings 212 and 214 or the like. The end plates 208 and 210 are provided with centrally located apertures 216 and 218 into which pressure gauges may be connected for the purpose described below and also into which in accordance with one form of the present invention fluid under pressure may be introduced in the manner described below. However, the chambers within the housing 196 are at least initially charged with hydraulic fluid through an aperture 220 in a cap 222 secured to the top of the housing. A breather 224 is also secured to the cap 222 for a purpose which will be readily apparent.

The above mentioned reactor shaft 182 is interconnected with the piston 200 so that upon rotation of the shaft, the piston is actuated toward either end of the cylinder. As shown best in Fig. 10, the shaft 182 is rotatably supported adjacent opposite ends by needle bearings 226, 228 and 230 and is held against axial movement by a snap ring 232 engaging in an annular slot in the shaft and abutting against a shoulder on the reactor housing. A retainer ring 234 engages the snap ring on the opposite side from the shoulder, which retainer ring is held in position by another snap ring 236. An O-ring 238 is provided in an annular groove in the retainer ring to restrain leakage of hydraulic fluid from the housing. At the opposite end of the shaft 182, the housing is sealed against the leakage of fluid by a double O-ring seal retainer 240 with O-rings 242 and 244, which retainer is held in position by a snap ring 246.

In order to connect the shaft 182 with the piston, the shaft is splined, as at 248, for cooperation with internal splines of a roller arm 250 mounted thereon. A set screw 252 is provided for preventing axial displacement between the roller arm and the shaft. As shown in Figs. 8 and 9, the mid portion of the piston 200 is recessed, as at 254 and 256, and the lower end of the roller arm 250 extends into these recesses in the piston. A roller 258 is mounted between opposite sides of a bifurcated end portion of the roller arm by means of a pin 260, and a needle bearing 262 is provided between the roller and the pin to insure free rotation of the roller. The piston head 206 is provided with a bore 264, which bore may conveniently be formed by drilling. In addition, the bore 264 is extended into the piston head 204, as at 266, and bearing plugs 268 and 270 are inserted into the bores 264 and 266, respectively, for engagement with the roller 258. Since the bore 264 extends entirely through the piston head 206, an O-ring 272 is provided around the bearing plug 268 to prevent the passage of any liquid through the piston. The bearing plug 270 does not require any such O-ring, but the bore 266 is preferably vented, as by the passage 274, to facilitate assembly of the plug 270.

Spaces 276 and 278 at the opposite ends of the piston cylinder 198 are interconnected through passageways 280, 282 and 284 formed in the reactor housing. However, valve means is provided in the passageway 282 to prevent the flow of fluid therethrough until the fluid pressure has been built up to a predetermined amount. This valve means includes a reduced diameter portion 286 in the passageway 282 providing a valve seat and a valve 288 cooperating with the valve seat. The valve is resiliently biased toward a closed position by means of a compression spring 290 acting between an enlarged head 292 on the valve stem and a plug 294 threaded into a bore 296 formed in the housing. The plug 294 is secured to an adjusting stem and knob assembly 298, and the outer end of the bore 296 is sealed by means of a bushing cap 300 and O-rings 302 and 304. With this structure, it is seen that the pressure of the spring 290 may be varied by adjusting the threaded plug 294 so that the fluid pressure required to open the valve 288 may be controlled. The adjusting stem 298, and hence the plug 294, may be locked in the desired position by means of a set screw 303 threaded into the bushing 300. Preferably, an unthreaded brass plug 305 is disposed between the set screw 303 and the adjusting stem 298 to prevent marring of the stem, and thus possible leakage of the fluid. Preferably, the valve 288 is provided with a fluted extension 306 slidable in the elongated valve seat 286 to assure straight line movement of the valve, it being understood that after the valve has moved sufficiently to the right, as viewed in Fig. 8, to expose the fluted end 306 to the enlarged portion of the passageway 282, fluid may pass through the valve and into the passageway 284. The end of the bore 282 opposite the above described relief valve is sealed by means of a plug 308 and an O-ring 310.

While the above described passageway and relief valve means permits the flow of fluid from the cylinder end 276 to the end 278 when the piston is moved toward the left, as viewed in Fig. 8, additional and similar passageway and relief valve means have been provided to permit the flow of fluid from the cylinder end 278 to the end 276 when the piston is moved toward the right. This additional means is shown best in Figs. 9 and 10 and includes passageways 312, 314 and 316 formed in the reactor housing 196. The passageway 314 includes a restricted valve seat 318 for cooperating with an adjustable relief valve assembly generally designated by the numeral 320. The valve assembly 320 is substantially identical to the above described relief valve means controlling the flow of fluid through the passageways 280, 282 and 284 and, therefore, need not be described in detail.

Even though the opposite heads 204 and 206 of the piston are each provided with a plurality of piston rings, as illustrated, a small amount of fluid leakage past the piston heads and into the reservoir 202 may occur upon movement of the piston. Such fluid leakage causes a certain amount of backlash or play in the movement of the piston upon reversal thereof, which is undesirable from a standpoint of test accuracy, and in accordance with the present invention, various means are provided to compensate for the fluid leakage past the piston heads and to eliminate such backlash or play. In the embodiment shown in Figs. 8, 9, 10 and 11, this means is in the form of a pair of check valves 322 and 324 for automatically permitting intake of makeup fluid from the reservoir 202 into the fluid passageway 282 or 314 in accordance with the direction of movement of the piston. The valve 322 is disposed within a bore 326 which intersects the passageway 282 and has an upper reduced diameter portion 328 communicating with the reservoir 202. A valve insert 330 sealed by an O-ring 332 is disposed in the bore 326 to provide a proper seat for the valve 322 which moves as a unit with a press-fitted sleeve 334 and an O-ring seal 336. The valve is normally held in a closed position by a compression spring 338 which abuts against a screw 340 threaded into the bore 326 for adjusting the compression of the spring. The lower end of the bore 326 is closed and sealed by means of a plug 342 and an O-ring 344. The valve 324 is arranged similarly to the valve 322 to control the entry of a fluid into the passageway 314. Thus, the valve 324 is disposed in a bore 346 having an upper reduced diameter portion 348 communicating with the reservoir and the valve along with a sleeve 350 seats against a valve seat 352. A compression spring 354 is disposed between the valve 324 and an adjusting screw 356 for maintaining the valve normally in a closed position.

When the piston moves toward the left, as viewed in Fig. 8, the hydraulic fluid will move from the chamber 276 through passageways 280, 282 and 284 to the chamber 278. Assuming some leakage of the hydraulic fluid passed the piston head 204 and into the reservoir 202, there will not be enough fluid displaced from the chamber 276 through the passageways to fill the chamber 278. Hence, a vacuum will be created in the chamber 278, and this reduced pressure causes the valve 324 to shift so that makeup fluid from the reservoir 202 passes through the passageways 314 and 312 into the chamber 278. The chamber 278 is thereby maintained in a substantially filled condition so that when the piston is shifted to the right, there will be little or no backlash or play. It is understood, of course, that when the piston is shifted toward the right, and fluid leakage occurs past the piston head 206, the check valve 322 will operate to permit entry of makeup fluid from the reservoir 202 into the chamber 276.

Figure 12:
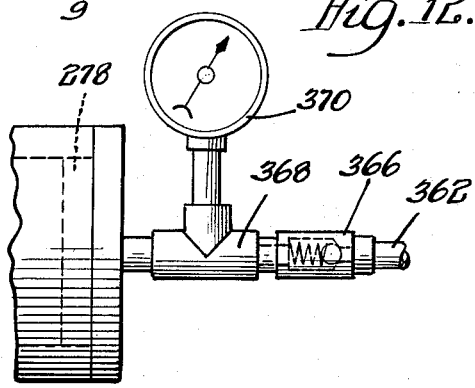
Fig. 12 is a fragmentary elevational view showing a modified form of this invention.

The above mentioned backlash or slack in the operation of the piston may sometimes be even more positively eliminated by providing means which relies on pressure rather than vacuum to admit makeup fluid. Such means is somewhat diagrammatically illustrated in Figs. 12 and 15 and includes a low pressure pump 358 of any conventional design for continually pumping fluid at low pressure into conduits 360 and 362 connected with opposite ends of the piston cylinder 198. A relief valve 364 is provided on the discharge side of the low pressure pump for recirculating the fluid to the reservoir in a manner to maintain a predetermined precharging pressure in the conduits 360 and 362. As shown in Fig. 12, the conduit 362 may be connected to the end chamber 278 by means of a check valve assembly 366 communicating with one end of a T-connector 368. A pressure gauge 370 communicates with the T-connector for the purpose described hereinbelow. It is understood, of course, that the conduit 362 may be connected with the piston cylinder end chamber 276 by a check valve 372 arranged similarly to the check valve 366 and a pressure gauge 376 also communicates with the end chamber 276. In this modified form of the invention, the above described check valves 322 and 324 have been eliminated so that upon any tendency to form a vacuum in one of the cylinder end chambers during operation of the piston, either the check valve 366 or 372 is operated to admit makeup fluid under pressure from the lines 360 and 362.

The hydraulic circuit for the apparatus illustrated in Figs. 1 through 10 is diagrammatically shown in Figs. 13 and 14. Ordinarily, there will be a number of power steering units to be tested on the apparatus, and it is desirable to operate the above described pump 104 and motor 106 continuously. Thus, the manual control valve 112 is operable, as shown in Fig. 14, to cut off the flow of fluid through the line 114 to the steering unit so that the pump merely circulates fluid from the reservoir 20 through the pump intake line 108, the pump discharge line 110, the valve 112, and back to the reservoir through line 378. While the pump is merely circulating fluid, lines 114 and 126 may be disconnected from a previously tested steering unit to be replaced by another unit to be tested. The pin 194 is removed to permit the connecting rod 186 to swing free of the pitman arm 88, whereupon the pitman arm is removed from the tested unit. The clamping means of bracket 22 is released, and the tested unit is then removed from the stand and replaced by another unit whereupon the clamping means is reengaged. The pitman arm is then assembled on the new power steering unit to be tested, and the rod 186 is connected to the pitman arm by means of the pin 194. The hydraulic fluid lines 114 and 126 are then connected with the steering unit, whereupon the manual control valve 112 is shifted to close off the fluid return line 378 and direct fluid into the line 114 and to the steering unit. The pressure in the steering unit builds up until a relief valve 382 adjacent the pump opens, whereupon the pump merely circulates fluid through line 384, relief valve 382, and line 386 back to the reservoir. The pressure gauge 120 adjacent the control valve is connected to indicate the amount of fluid pressure available to the power steering unit. As pointed out hereinabove, pressure gauges are inserted in the centers of the reactor piston cylinder end caps 208 and 210, and such pressure gauges are indicated by numerals 388 and 390.

After the valve 112 is shifted to connect the line 114 to the pump, the actual testing of the steering unit may proceed. The shaft 34 of the steering unit is turned, for example, clockwise. As before explained, as long as the port 66 of the steering unit is kept open, the piston 46 of the steering unit will move, unless, of course, it reaches the limit of its movement. When the shaft 34 is turned clockwise, the piston 46 and valve 58 will move downwardly or toward the right, as viewed in Fig. 1, and the pitman arm 88 will move in a counterclockwise direction. The pitman arm 88 through the connecting rod 186, reactor shaft 182, and reactor arm 184 moves the reactor piston toward the right, as viewed in Figs. 1, 8, 9, and 13, so that fluid in the reactor end chamber 278 is subjected to pressure by the piston. The reading on the pressure gauge 390 will thus be a measure of the power steering torque available at the pitman arm 88 to turn the wheels of a motor vehicle to the right. If the power steering unit shaft 34 is turned counterclockwise, it is obvious that the reactor piston will be moved in the opposite direction to apply pressure to the cylinder end chamber 276, and the reading on the pressure gauge 388 will be a measure of the power steering torque available at the pitman arm to turn the wheels of a motor vehicle toward the left. If the shaft 34 must be turned an excessive amount before a reaction is observed on one of the reactor gauges 388 or 390, or if the pressure at the gauges, and hence the torque available at the pitman arm for power steering is below a predetermined amount, the power steering unit under test will be rejected.

From the above description, it is seen that the present invention has provided a novel testing apparatus fully capable of satisfying the objects heretofore set forth. More specifically, it is seen that the present invention has provided a novel apparatus upon which a power steering unit may be quickly and easily mounted and rapidly tested, whereby the testing operation may be performed economically. In addition, it is seen that the novel reactor of this invention not only permits the testing operation to be carried out rapidly and economically, but also is operable to provide accurate measurements of the torques developed by the steering unit being tested.

While the preferred embodiments of the present invention have been shown and described herein, it is obvious that many structural details may be changed without departing from the spirit and scope of the appended claims.

The invention is claimed as follows:

1. A testing apparatus for a steering mechanism, comprising base means, means associated with said base means for supporting a steering mechanism to be tested, hydraulic reactor means for building up a fluid pressure in accordance with torque developed by said steering mechanism upon actuation of the steering mechanism, said reactor means including a cylinder and a relatively shiftable piston within said cylinder, means for operatively connecting said reactor means with a steering mechanism on said support means for relatively shifting said piston toward one end of the cylinder in response to operation of the steering mechanism, conduit means for directing hydraulic fluid from said one end of the cylinder, and means preventing flow of hydraulic fluid through said conduit means until a predetermined pressure has been generated by said piston in response to operation of said steering mechanism.

2. A testing apparatus for a steering mechanism, comprising base means, means associated with said base means for supporting a steering mechanism to be tested, hydraulic reactor means including cylinder means and piston means relatively shiftable within said cylinder means and operable in reverse directions for testing torque developed by said steering mechanism upon actuation of the steering mechanism in opposite directions, fluid conduit means connected with each end portion of said cylinder means for directing fluid from said end portions, flow restricting means in each of said fluid conduit means preventing flow of fluid from said end portions until a predetermined pressure has been generated by said piston means within said end portions in response to operation of said steering mechanism, and means for operatively connecting said reactor means with a steering mechanism on said support means.

3. A testing apparatus for a steering mechanism, comprising base means, means associated with said base means for supporting a steering mechanism to be tested, hydraulic reactor means operable in reverse directions for testing torque developed by a steering mechanism upon actuation of the steering mechanism in opposite direction, said reactor means including cylinder means and piston means within said cylinder means and comprising oppositely facing rigidly interconnected head portions, said piston means being selectively relatively shiftable toward opposite ends of said cylinder means, means for maintaining end portions of said cylinder means substantially filled with hydraulic fluid while said piston means moves away therefrom thereby substantially eliminating any possibility of backlash in said hydraulic reactor means upon operation thereof in reverse directions, and means for operatively connecting said reactor means with a steering mechanism on said support means.

4. A testing apparatus for a steering mechanism, comprising means for supporting a steering mechanism to be tested, reactor means for testing torque developed by a supported steering mechanism upon actuation of said steering mechanism, said reactor means including a hydraulic cylinder, a double-headed piston slidably mounted within said cylinder, fluid passageway means connecting opposite ends of said cylinder, and valve means in said fluid passageway means for preventing fluid flow from one end of said cylinder to the other end until the piston has been actuated to build up a predetermined pressure in said one end, the fluid pressure in said one end indicating the torque developed by the steering mechanism when actuated in one direction, said valve means also being operable upon reverse movement of the piston for preventing fluid flow from said other end to said one end until the fluid pressure in said other end has been built up to a predetermined amount, the fluid pressure in said other end indicating the torque developed by the steering mechanism when actuated in the opposite direction, and means for operatively connecting said piston with a steering mechanism on said support means.

5. A testing apparatus, as defined in claim 4, which includes means for substantially eliminating any backlash of said piston upon reverse actuation of the piston.

6. A testing apparatus, as defined in claim 4, which includes means operable upon movement of the piston toward one end of the cylinder for introducing makeup fluid into the opposite end of the cylinder, whereby to eliminate substantially any backlash in the movement of the piston.

7. An apparatus for testing the operativeness and effectiveness of steering units comprising hydraulic reacting means adapted to be operatively connected to a steering unit to provide resistance to operation of the steering unit, said reacting means including a cylinder having a piston chamber therein, a piston in said chamber, fluid conducting means interconnecting the opposite ends of said chamber, and flow restricting means in said fluid conducting means preventing flow of fluid from one end of said chamber to the other until a predetermined pressure has been generated by said piston in response to operation of said steering unit.

8. An apparatus for testing steering units comprising a reactor, said reactor including a fluid cylinder, double-headed piston means slidably disposed in said cylinder, means to which forces may be applied for actuating said piston means in opposite directions, fluid passageway means connecting opposite ends of the cylinder, valve means in said passageway means for preventing flow of fluid therethrough until a predetermined force has been applied to said actuating means tending to move the piston means toward one end of the cylinder, and means for maintaining the other end of the cylinder substantially full of fluid to eliminate substantially any backlash upon reverse movement of the piston means.

9. An apparatus, as defined in claim 8, wherein said last mentioned means includes a source of fluid, and means including a valve operable to admit fluid from said source into said other end of the cylinder whenever fluid pressure in said other end drops below a predetermined amount.

10. An apparatus for testing the operativeness and effectiveness of steering units comprising hydraulic reacting means adapted to be operatively connected to a steering unit to provide resistance to operation of the steering unit, said reacting means including a cylinder having a piston chamber therein, a piston in said chamber, fluid conducting means interconnecting the opposite ends of said chamber, flow restricting means in said fluid conducting means preventing flow of fluid from one end of said chamber to the other until a predetermined pressure has been generated by said piston in response to operation of said steering unit, and means for adjusting said flow restricting means to vary said predetermined pressure.

11. An apparatus for testing the operativeness and effectiveness of steering units comprising hydraulic reacting means adapted to be operatively connected to a steering unit to provide resistance to operation of the steering unit, said reacting means including a cylinder having a piston chamber therein, a piston in said chamber, fluid conducting means interconnecting the opposite ends of said chamber, flow restricting means in said fluid conducting means preventing flow of fluid from one end of said chamber to the other until a predetermined pressure has been generated by said piston in response to operation of said steering unit, and indicating means for measuring the steering torque developed by said steering unit.

12. An apparatus for testing the operativeness and effectiveness of steering units comprising hydraulic reacting means adapted to be operatively connected to a steering unit to provide resistance to operation of the steering unit, said reacting means including a cylinder having a piston chamber therein, a piston in said chamber, fluid conducting means interconnecting the opposite ends of said chamber, flow restricting means in said fluid conducting means preventing flow of fluid from one end of said chamber to the other until a predetermined pressure has been generated by said piston in response to operation of said steering unit, means for adjusting said flow resrticting means to vary said predetermined pressure, and indicating means for measuring the steering torque developed by said steering unit.

13. An apparatus for testing the operativeness and effectiveness of steering units comprising hydraulic reacting means adapted to be operatively connected to a steering unit to provide resistance to operation of the steering unit, said reacting means including a cylinder having a piston chamber therein, a pair of rigidly interconnected pistons in said chamber, fluid conducting means interconnecting the opposite ends of said chamber, flow restricting means in said fluid conducting means preventing flow of fluid from one end of said chamber to the other until a predetermined pressure has been generated by one of said pistons in response to operation of said steering unit, compensating fluid conducting means connected to the opposite ends of said chamber to admit make-up fluid thereto to compensate for any leakage of fluid from the ends of said chamber past said pistons, a fluid reservoir connected to said compensating fluid conducting means, and flow restricting means in said compensating fluid conducting means preventing flow of fluid from the ends of said chamber toward said fluid reservoir.

14. An apparatus for testing the operativeness and effectiveness of steering units comprising hydraulic reacting means adapted to be operatively connected to a steering unit to provide resistance to operation of the steering unit, said reacting means including a cylinder having a piston chamber therein, a pair of rigidly interconnected pistons in said chamber, fluid conducting means interconnecting the opposite ends of said chamber, flow restricting means in said fluid conducting means preventing flow of fluid from one end of said chamber to the other until a predetermined pressure has been generated by one of said pistons in response to operation of said steering unit, means for adjusting said flow restricting means to vary said predetermined pressure, compensating fluid conducting means connected to the opposite ends of said chamber to admit make-up fluid thereto to compensate for any leakge of fluid from the ends of said chamber past said pistons, a fluid reservoir connected to said compensating fluid conducting means, and flow restricting means in said compensating fluid conducting means preventing flow of fluid from the ends of said chamber toward said fluid reservoir.

15. An apparatus for testing the operativeness and effectiveness of steering units comprising hydraulic reacting means adapted to be operatively connected to a steering unit to provide resistance to operation of the steering unit, said reacting means including a cylinder having a piston chamber therein, a pair of rigidly interconnected pistons in said chamber, fluid conducting means interconnecting the opposite ends of said chamber, flow restricting means in said fluid conducting means preventing flow of fluid from one end of said chamber to the other until a predetermined pressure has been generated by one of said pistons in response to operation of said steering unit, compensating fluid conducting means connected to the opposite ends of said chamber to admit make-up fluid thereto to compensate for any leakage of fluid from the ends of said chamber past said pistons, a fluid reservoir connected to said compensating fluid conducting means, flow restricting means in said compensating fluid conducting means preventing flow of fluid from the ends of said chamber toward said fluid reservoir, and indicating means for measuring the steering torque developed by said steering unit.

16. An apparatus for testing the operativeness and effectiveness of steering units comprising hydraulic reacting means adapted to be operatively connected to a steering unit to provide resistance to operation of the steering unit, said reacting mean including a cylinder having a piston chamber therein, a pair of spaced rigidly interconnected pistons in said chamber, fluid conducting means interconnecting the opposite ends of said chamber, flow restricting means in said fluid conducting means preventing flow of fluid from one end of said chamber to the other until a predetermined pressure has been generated by one of said pistons in response to operation of said steering unit, means for adjusting said flow restricting means to vary said predetermined pressure, compensating fluid conducting means connected to the opposite ends of said chamber to admit make-up fluid thereto to compensate for any leakage of fluid from the ends of said chamber into the space between said pistons, a fluid reservoir connected to said compensating fluid conducting means, flow restricting means in said compensating fluid conducting means preventing flow of fluid from the ends of said chamber toward said fluid reservoir, and indicating means for measuring the steering torque developed by said steering unit.

17. An apparatus for testing the operativeness and effectiveness of steering units comprising hydraulic reacting means adapted to be operatively connected to a steering unit to provide resistance to operation of the steering unit, said reacting means including a cylinder having a piston chamber therein, a pair of rigidly interconnected pistons in said chamber, fluid conducting means interconnecting the opposite ends of said chamber, flow restricting means in said fluid conducting means preventing flow of fluid from one end of said chamber to the other until a predetermined pressure has been generated by one of said pistons in response to operation of said steering unit, compensating fluid conducting means connected to the opposite ends of said chamber to admit make-up fluid thereto to compensate for any leakage of fluid from the ends of said chamber past said pistons, a fluid reservoir connected to said compensating fluid conducting means, flow restricting means in said compensating fluid conducting means preventing flow of fluid from the ends of said chamber toward said fluid reservoir, and a pump interposed in said compensating fluid conducting means between said reservoir and the flow restricting means in said compensating fluid conducting means to pump said make-up fluid into the ends of said chamber.

18. An apparatus for testing the operativeness and effectiveness of steering units comprising hydraulic reacting means adapted to be operatively connected to a steering unit to provide resistance to operation of the steering unit, said reacting means including a cylinder having a piston chamber therein, a pair of spaced rigidly interconnected pistons in said chamber, fluid conducting means interconnecting the opposite ends of said chamber, flow restricting means in said fluid conducting means preventing flow of fluid from one end of said chamber to the other until a predetermined pressure has been generated by one of said pistons in response to operation of said steering unit, means for adjusting said flow restricting means to vary said predetermined pressure, compensating fluid conducting means connected to the opposite ends of said chamber to admit make-up fluid thereto to compensate for any leakage of fluid from the ends of said chamber into the space between said pistons, a fluid reservoir connected to said compensating fluid conducting means, flow restricting means in said compensating fluid conducting means preventing flow of fluid from the ends of said chamber toward said fluid reservoir, and a pump interposed in said compensating fluid conducting means between said reservoir and the flow restricting means in said compensating fluid conducting means to pump said make-up fluid into the ends of said chamber.

19. An apparatus for testing the operativeness and effectiveness of steering units comprising hydraulic reacting means adapted to be operatively connected to a steering unit to provide resistance to operation of the steering unit, said reacting means including a cylinder having a piston chamber therein, a pair of spaced rigidly interconnected pistons in said chamber, fluid conducting means interconnecting the opposite ends of said chamber, flow restricting means in said fluid conducting means preventing flow of fluid from one end of said chamber to the other until a predetermined pressure has been generated by one of said pistons in response to operation of said steering unit, means for adjusting said flow restricting means to vary said predetermined pressure, compensating fluid conducting means connected to the opposite ends of said chamber to admit make-up fluid thereto to compensate for any leakage of fluid from the ends of said chamber into the space between said pistons, a fluid reservoir connected to said compensating fluid conducting means, flow restricting means in said compensating fluid conducting means preventing flow of fluid from the ends of said chamber toward said fluid reservoir, a pump interposed in said compensating fluid conducting means between said reservoir and the flow restricting means in said compensating fluid conducting means to pump said make-up fluid into the ends of said chamber, and indicating means for measuring the steering torque developed by said steering unit.

References Cited in the file of this patent

UNITED STATES PATENTS

| | | |
|---|---|---|
| 1,847,126 | Matthews | Mar. 1, 1932 |
| 2,216,563 | Cartier | Oct. 1, 1940 |
| 2,381,549 | Mabery | Aug. 7, 1945 |
| 2,405,060 | Scofield | July 30, 1946 |
| 2,554,774 | Buivid | May 29, 1951 |